(12) United States Patent
Gill

(10) Patent No.: US 10,356,313 B2
(45) Date of Patent: Jul. 16, 2019

(54) SYSTEMS AND METHODS FOR LENSLESS IMAGE ACQUISITION

(71) Applicant: Rambus Inc., Sunnyvale, CA (US)

(72) Inventor: Patrick R. Gill, Sunnyvale, CA (US)

(73) Assignee: Rambus Inc., Sunnyvale, CA (US)

(*) Notice: Subject to any disclaimer, the term of this patent is extended or adjusted under 35 U.S.C. 154(b) by 0 days.

(21) Appl. No.: 15/547,155

(22) PCT Filed: Feb. 5, 2016

(86) PCT No.: PCT/US2016/016837
§ 371 (c)(1),
(2) Date: Jul. 28, 2017

(87) PCT Pub. No.: WO2016/130437
PCT Pub. Date: Aug. 18, 2016

(65) Prior Publication Data
US 2018/0020157 A1     Jan. 18, 2018

Related U.S. Application Data

(60) Provisional application No. 62/115,590, filed on Feb. 12, 2015, provisional application No. 62/115,586, filed on Feb. 12, 2015.

(51) Int. Cl.
*H04N 5/232* (2006.01)
*G06T 5/00* (2006.01)
(Continued)

(52) U.S. Cl.
CPC ....... *H04N 5/23222* (2013.01); *G02B 5/1814* (2013.01); *G02B 5/1871* (2013.01); *G02B 27/4205* (2013.01); *G06T 5/002* (2013.01); *G06T 5/003* (2013.01); *G06T 5/10* (2013.01); *H04N 5/357* (2013.01); *G06T 2207/20048* (2013.01)

(58) Field of Classification Search
CPC .............. H04N 5/23222; G02B 5/1814; G02B 27/4205; G06T 5/002
See application file for complete search history.

(56) References Cited

U.S. PATENT DOCUMENTS

2005/0083531 A1* 4/2005 Millerd ................. G01J 3/2803
356/450
2006/0091300 A1* 5/2006 Nishimura ............... G01J 3/02
250/226

(Continued)

OTHER PUBLICATIONS

Lensless Ultra-Miniature CMOS Computational Imagers and Sensors (Year: 2013).*

(Continued)

*Primary Examiner* — Ahmed A Berhan
(74) *Attorney, Agent, or Firm* — Silicon Edge Law Group LLP; Arthur J. Behiel

(57) ABSTRACT

Image-sensing devices include odd-symmetry gratings that cast interference patterns over a photodetector array. Grating features offer considerable insensitivity to the wavelength of incident light, and also to the manufactured distance between the grating and the photodetector array. Photographs and other image information can be extracted from interference patterns captured by the photodetector array. Efficient extraction algorithms based on Fourier deconvolution introduce barrel distortion, which can be removed by resampling using correction functions. The sensing devices can be made to minimize distortion that results from efficient extraction algorithms based on Fourier deconvolution.

13 Claims, 11 Drawing Sheets

(51) Int. Cl.
*G06T 5/10* (2006.01)
*H04N 5/357* (2011.01)
*G02B 27/42* (2006.01)
*G02B 5/18* (2006.01)

(56) References Cited

U.S. PATENT DOCUMENTS

| | | | |
|---|---|---|---|
| 2006/0256226 A1* | 11/2006 | Alon | G02B 27/0012 348/335 |
| 2007/0298533 A1* | 12/2007 | Yang | G02B 5/1871 438/57 |
| 2011/0279818 A1* | 11/2011 | Amako | G01J 3/1804 356/328 |
| 2014/0253781 A1 | 9/2014 | Gill et al. | |
| 2015/0061065 A1 | 3/2015 | Gill et al. | |

OTHER PUBLICATIONS

Garcia-Martinez et al., "Generation of Bessel Beam Arrays Through Dammann Gratings", Mar. 20, 2012, vol. 51, No. 9, Applied Optics. pp. 1375-1381. 7 Pages.

Gill, Patrick et al., "Lensless Ultra-Miniature Imagers Using Odd-Symmetry Spiral Phase Gratings", article presented at Computational Optical Sensing and Imaging (COSI), Arlington, Virginia, Jun. 23-27, 2013. 3 pages.

Gill, Patrick et al., "Lensless Ultra-Miniature Imagers Using Odd-Symmetry Spiral Phase Gratings", slide deck presented at Computational Optical Sensing and Imaging (COSI), Arlington, Virginia, Jun. 23-27, 2013. 18 pages.

Guerineau, N. et al., "Generation of Achromatic and Propagation-Invariant Spot Arrays by Use of Continuously Self-Imaging Gratings", vol. 26, No. 7, Apr. 1, 2001. 3 pages.

Horisaki, Ryoichi et al., "Regularized image Reconstruction for Continuously Self-Imaging Gratings", vol. 52, No. 16, Jun. 1, 2013. 10 pages.

Notification Concerning Transmittal of International Preliminary Report on Patentability dated Aug. 24, 2017 re: Int'l Appln. No. PCT/US2016/016837. 10 Pages.

Notification of Transmittal of the International Search Report and the Written Opinion of the International Searching Authority dated Apr. 22, 2016 re Int'l. Appln. No. PCT/US16/016837. 14 Pages.

Piponnier, Martin et al., "Relevance of Continuously Self-Imaging Gratings for Noise Robust Imagery" vol. 37 No. 17, Sep. 1, 2012. 3 pages.

* cited by examiner

SYSTEMS AND METHODS FOR LENSLESS IMAGE ACQUISITION

BACKGROUND

A relatively new type of image-sensing device employs an odd-symmetry grating to project an interference pattern for capture by a photodetector array. The grating offers considerable insensitivity to the wavelength of incident light in a wavelength band of interest, and also to the manufactured distance between the grating and the array. The grating produces an interference pattern quite different from the captured scene, but that contains sufficient information to mathematically reconstruct the scene or aspects of the scene. Images can thus be captured without a lens, and cameras can be made smaller than those that are reliant on lenses and ray-optical focusing. Embodiments of such image-sensing devices are detailed in U.S. Publication 2014/0253781, which is incorporated herein by reference.

Some imaging applications do not require reconstruction of the imaged scene. For example, tracking movement of a point source using an odd-symmetry grating does not require the overall scene be reconstructed. Where image reconstruction is desired, however, the mathematical operations used to invert the raw image data can be computationally cumbersome.

BRIEF DESCRIPTION OF THE DRAWINGS

The detailed description is illustrated by way of example, and not by way of limitation, in the figures of the accompanying drawings and in which like reference numerals refer to similar elements and in which:

FIG. 12 is a cutaway view of a device 1200 similar to device 1000 of FIGS. 10 and 11 with like-identified elements being the same or similar.

FIG. 13 is a cutaway view of a device 1300 similar to device 1000 of FIGS. 10 and 11 with like-identified elements being the same or similar.

DETAILED DESCRIPTION

Figure 1A:
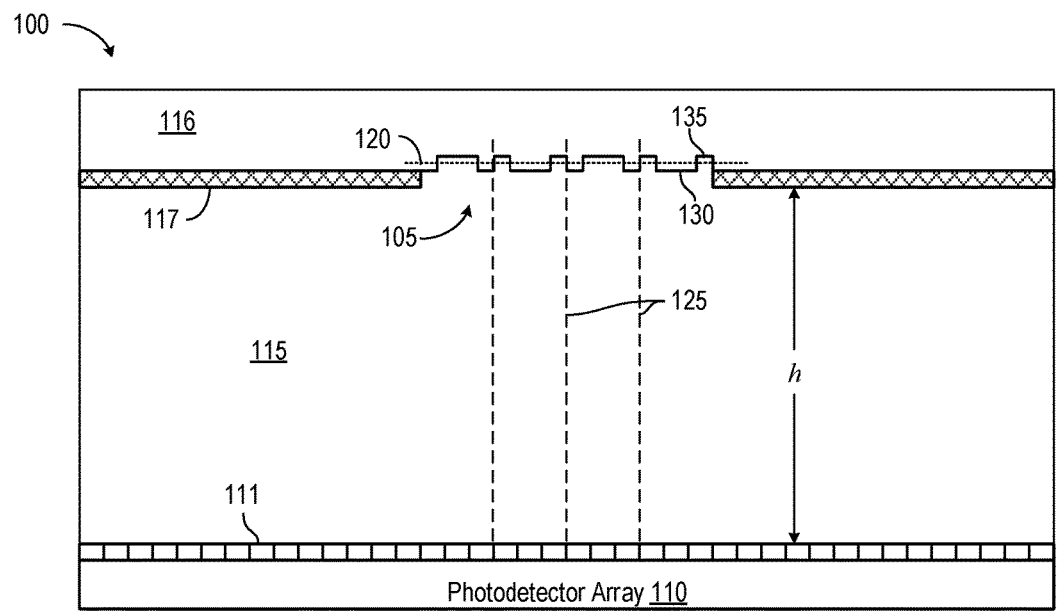
FIG. 1A is a cut-away view of an imaging device 100 with a binary, phase-antisymmetric grating 105 overlying a photodetector array 110.

FIG. 1A is a cut-away view of an imaging device 100 with a binary, phase-antisymmetric grating 105 overlying a photodetector array 110, such as a CCD (charge-coupled device), CMOS (complementary metal-oxide-semiconductor) or (in the case of thermal IR detection) a microbolometer sensor. Photodetector array 110 includes photoelements 111, and may additionally include a lenslet array that concentrates incident photons onto the most sensitive areas of array 110 to increase quantum efficiency. The features of grating 105 offer considerable insensitivity to the wavelength of incident light in a wavelength band of interest, and also to the manufactured distance between grating 105 and photodetector array 110.

Light in a wavelength band of interest strikes grating 105 from a direction that is normal to the plane 120 of grating 105. (Unless otherwise stated, the wavelength band of interest is the visible spectrum. Cameras developed for use in different applications can have different bands of interest, as is well understood by those of skill in the art.) Grating 105 produces an interference pattern for capture by array 110. Digital photographs and other image information can then be extracted from the pattern. Device 100 is constructed to produce raw image data of high fidelity to support efficient algorithms for image extraction. Efficient extraction algorithms based on Fourier deconvolution introduce barrel distortion, which can be removed by resampling using correction functions.

Grating 105 is formed by an interface between light-transmissive media of different refractive indices, an optical Lanthanum dense flint glass layer 115 and polycarbonate plastic layer 116 above grating 105 in this example. Each of three boundaries of odd symmetry 125 is indicated using a vertical, dashed line. The lower features 130 of grating 105 induce phase retardations of half of one wavelength ($\pi$ radians) relative to higher features 135. Features on either side of each boundary exhibit odd symmetry. With this arrangement, paired features induce respective phase delays that differ by approximately half a wavelength over the wavelength band of interest (e.g., visible light). Due to dispersion, the difference in the refractive index of the Lanthanum dense flint glass layer 115 and the polycarbonate above grating 105 is an increasing function of wavelength, facilitating a wider wavelength band of interest over which the phase delay is approximately $\pi$ radians. These elements produce an interference pattern for capture by array 110.

Device 100 includes an optional opaque layer 117 patterned to include an aperture that encompasses or defines the effective limits of grating 105. The aperture windows captured interference patterns, which tends to reduce edge effects that result from subsequent image-recovery algorithms. The aperture can also improve angle sensitivity and spurious light rejection, which can be advantageous for e.g. motion detection and measurement. Opaque layer 117 can be applied directly to a layer forming grating 105, and may be coplanar or nearly coplanar with grating 105. Other embodiments omit the aperture, or may include an aperture spaced away from device 100 instead of or in addition to the aperture in layer 117.

The example of FIG. 1A assumes light incident the light interface of device 100 is normal to the plane of phase grating 105, in which case, by Huygens' principle, pairs of spherical wave re-radiators equidistant from one of the boundaries of odd symmetry 125 cancel each other out due to the half wavelength phase delay of the radiator on one side of the boundary 125 compared to the other. Thus, light of any wavelength in the band of interest destructively interferes to produce curtains of minimum intensity under boundaries 125. Neither the depth nor the wavelength of light over a substantial spectrum significantly influences this destructive interference. Constructive interference similarly produces foci of maximum intensity. Both the low and high features 130 and 135 admit light, which provides relatively high quantum efficiency relative to embodiments that selectively block light.

Figure 1B:
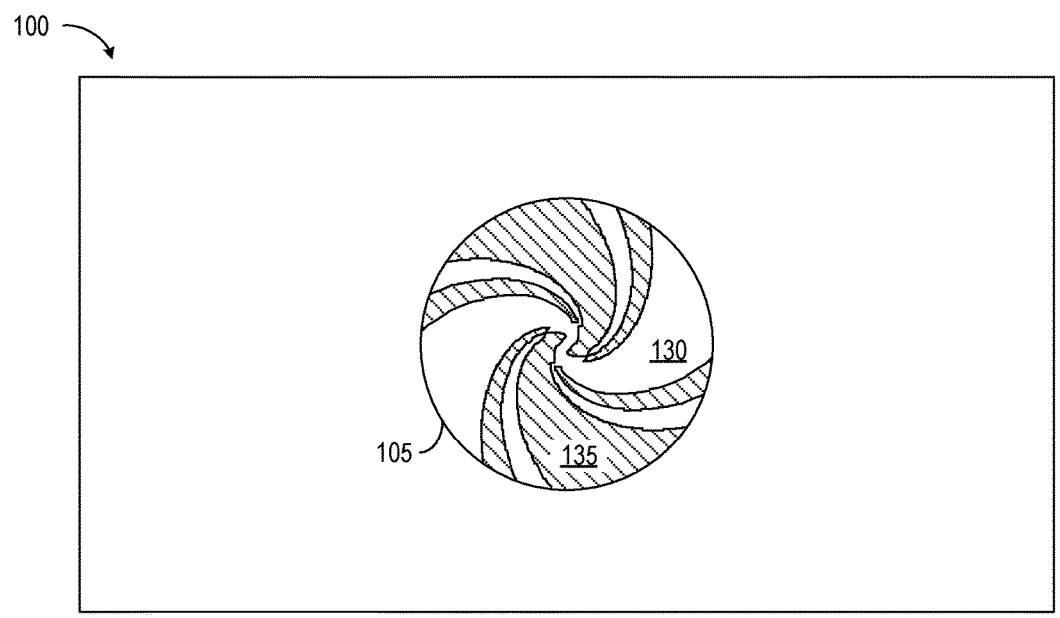
FIG. 1B is a plan view of imaging device 100 of FIG. 1A in accordance with an embodiment in which grating 105 includes spiral features 130 and 135 to produce two-dimensional diffraction patterns.

FIG. 1B is a plan view of imaging device 100 of FIG. 1A in accordance with an embodiment in which grating 105 includes spiral features 130 and 135 to produce two-dimensional diffraction patterns. Relatively narrow (wide) segment spacing works better for relatively high (low) frequencies, feature spacing increases along odd-symmetry boundaries (between elevated and recessed grating regions, represented by dark and light) with distance from the center. Curved boundaries of odd symmetry, defined between the elevated and recessed regions, extend radially from the center of the grating to the periphery, radiating out between the dark (elevated) and light (recessed) arms near the center. In some embodiments, the functional form of the curved boundaries approximates a logarithmic spiral. The area of grating 105 can be greater than that of the aperture in layer 117 to provide alignment tolerance in manufacturing.

Although device 100 can include or be used with a focusing element (e.g., a lens), device 100 does not require a focusing element to produce images. Rather than focusing, as would be done by a traditional camera, device 100 captures a diffraction pattern that bears little resemblance to an imaged scene, but that is nevertheless interpretable by a computer or processor. Grating 105 creates a certain point-spread function (PSF), a multi-armed thin spiral in this example, on the sensor array for every point of light in the imaged scene. The location of the center of the PSF is uniquely determined by the incident angle of light from the point source. Since faraway scenes can be thought of as collections of point sources of varying intensity, the sensed signals resemble a convolution of the PSF with the faraway scene. A scene can be computationally reconstructed from its corresponding interference pattern if there is a 1:1 map of scenes to sensor readings. In the case where the sensed signals are well approximated by a convolution with a fixed PSF, the Fourier components of the scene that are recoverable are the same as the Fourier components of the PSF with sufficient power to be observable above the noise sources in the system.

Figure 2:
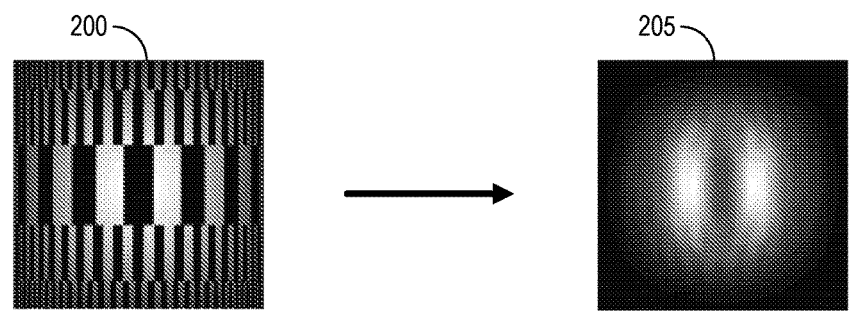
FIG. 2 depicts a test pattern 200 and corresponding interference pattern 205 captured by an embodiment of device 100 of FIGS. 1A and 1B.

FIG. 2 depicts a test pattern 200 and corresponding interference pattern 205 captured by an embodiment of device 100 of FIGS. 1A and 1B. Visually, pattern 205 bears little resemblance to pattern 200. Pattern 205 nevertheless includes sufficient information to provide an image that is geometrically similar to pattern 205.

Device 100 is a linear system, so image extraction can be accomplished by applying general linear inversion techniques to pattern 205. Such techniques multiply sensed data with the regularized pseudoinverse of the transformation exhibited by grating 105. However, these general techniques are computationally cumbersome, taking $O(n^4)$ operations and using $O(n^4)$ data for an n-by-n pixel array.

General linear algebra techniques fail to make use of the fact that the optical transform is approximately a convolution of a scene with the PSF of grating 105. If the optical transfer function instead were a simple convolution with the PSF, then one could reconstruct scenes using e.g. Fourier-domain regularized deconvolution algorithms. The computational complexity of these Fourier methods is $O(n^2 \log(n))$ and they require storage of a calibration occupying only $O(n^2)$ memory for an n-by-n pixel array. This advantage is offset for device 100 because Fourier deconvolution introduces significant barrel distortion.

Figure 3:
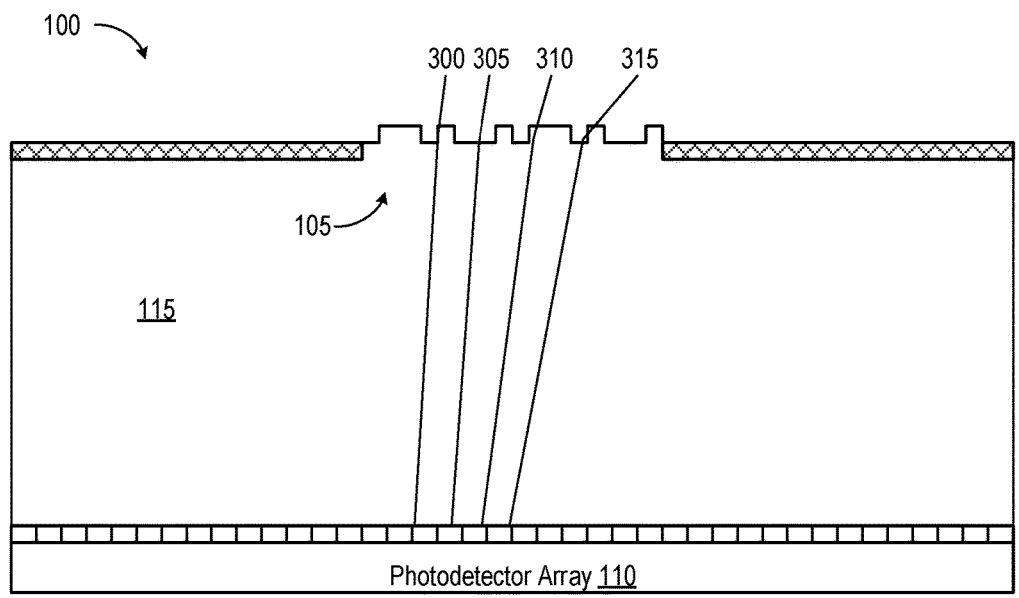
FIG. 3 depicts device 100 of FIGS. 1A and 1B with four rays 300, 305, 310, and 315 illustrating how the impact of Snell's law on device 100 produces demagnification that increases with incident angle.

FIG. 3 depicts device 100 of FIGS. 1A and 1B with four rays 300, 305, 310, and 315 illustrating how the impact of Snell's law on device 100 produces demagnification that increases with incident angle. The resultant distortion is commonly referred to as "barrel distortion" or "fisheye." The layer of polycarbonate plastic 116 and other elements from FIGS. 1A and 1B are omitted for ease of illustration.

Due to Snell's law, $$\sin\theta_r = \frac{n_i}{n_r}\sin\theta_i,$$

light incident the grating at a certain angle is refracted to propagate at an angle closer to the normal direction. For small angles, such as for ray 300, $\sin\theta \approx \theta \approx \tan\theta$; this has the effect of demagnifying the image by a factor $$\frac{n_i}{n_r}.$$

For larger incident angles, however, Snell's law imposes greater refraction and concomitant demagnification. The effect of this distortion is to pull light from greater incident angles (such as those at the corners of the field of view) towards the center of array 110 by a greater demagnification factor than for relatively smaller incident angles (such as those at the sides of the field of view).

Figure 4:
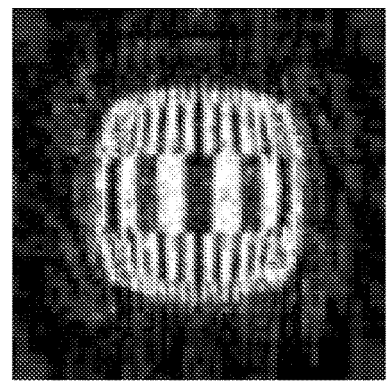
FIG. 4 shows a simulation of distorted image data 400 that results from a raw Fourier-domain reconstruction of interference pattern 205.

FIG. 4 shows a simulation of distorted image data 400 that results from a raw Fourier-domain reconstruction of interference pattern 205. The Fourier-domain inversion algorithm does not account for Snell's law distortion, so the reconstructed image data exhibits barrel distortion. One can see features of pattern 200 in data 400, but the reconstruction plainly includes considerable barrel distortion.

Figure 5:
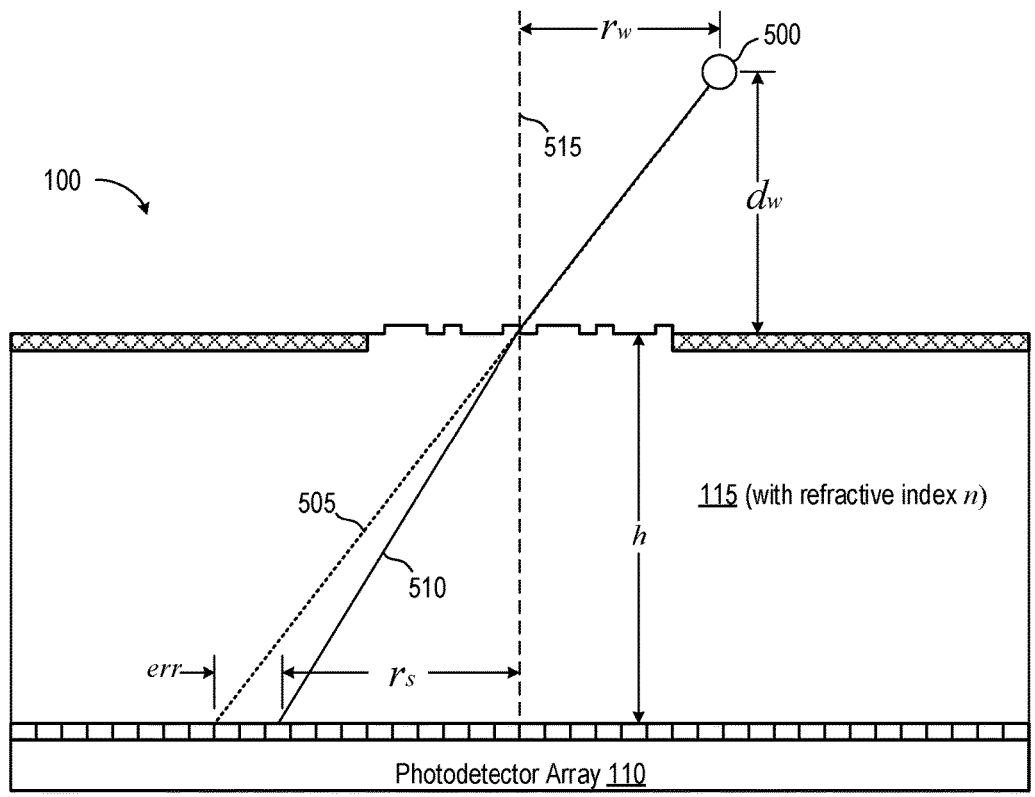
FIG. 5 is another cross section of device 100 of FIG. 1A and including an imaged object 500 emitting a ray with ideal path 505 and actual path 510 illustrating the impact of Snell's law.

FIG. 5 is another cross section of device 100 of FIG. 1A and including an imaged object 500 emitting a ray with ideal path 505 and actual path 510 illustrating the impact of Snell's law. Object 500 is a distance $d_w$ from device 100 and displaced from optical axis 515 by a lateral distance $r_w$. An error err represents the displacement of actual path 510 from ideal path 505, and these errors over the incident angles of incident light combine to create the barrel distortion noted previously.

Barrel distortion can be undone computationally by resampling as follows. The distance $r_s$ of the image of object 500 from the optical axis on array 110 is given by trigonometry and Snell's law as follows:

$$r_s = h\tan\left(\sin^{-1}\left(\frac{n_i}{n_r}\sin\left(\tan^{-1}\left(\frac{r_w}{d_w}\right)\right)\right)\right) \quad (1)$$

A mathematically-equivalent form of equation (1) that does not involve calls to trigonometric functions is:

$$r_s = \frac{hn_i r_w}{d_w n_r \sqrt{1 + \frac{r_w^2}{d_w^2}}\sqrt{1 - \frac{n_i^2 r_w^2}{n_r^2(d_w^2 + r_w^2)}}} \quad (2)$$

Here h is the grating-sensor separation, $n_i$ is the index of refraction between the sensor and the light source, and $n_r$ is the index of refraction in the medium between the grating and the sensor. Equation (1) can be used to calculate the location on array 110 whose center corresponds to light incident from any angle, making it possible to construct a distortion-free map of the imaged scene. Distance $d_w$ need not be known; distortion-free images are typically defined to be those where the image is geometrically similar to the object, and this similarity will hold for any assumed distance $d_w$.

Figure 6:
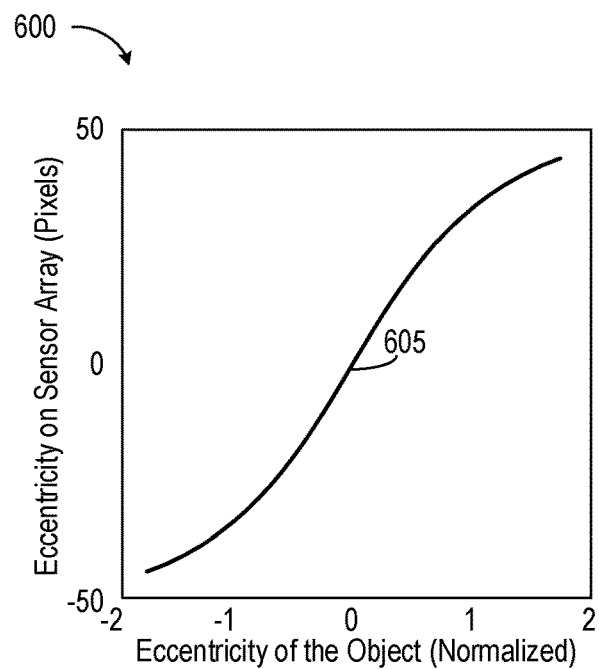
FIG. 6 is a plot of the distortion in equation (1) for simulations of light incident an embodiment of device 100.

FIG. 6 is a plot 600 of the distortion in (1) for simulations of light incident an embodiment of device 100. The location in the raw Fourier-domain reconstruction corresponding to any object's distance from the optical axis (normalized by lateral distance $r_w$) is given by a curve 605. For small eccentricities curve 605 is approximately straight, but for larger angles its slope decreases, indicating increased demagnification. This curve was computed with n=1.51, h=155 microns, and a pixel pitch of 2.5 microns.

Figure 7:
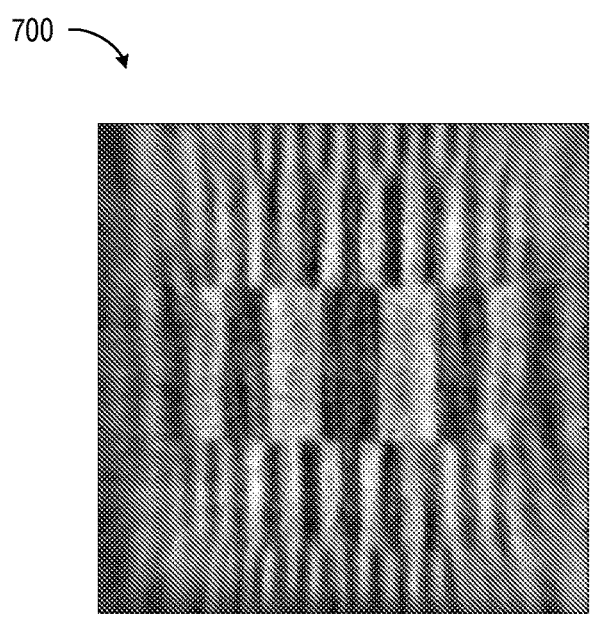
FIG. 7 depicts a reduced-distortion image 700 derived using linear interpolation based on the nearest four pixel addresses.

A lookup table generated using equation (1), or on-the-fly computation using equation (1), can be used to sample the distorted raw Fourier reconstruction (e.g., image data 400 of FIG. 4) to yield a reduced-distortion image. FIG. 7 depicts one such reduced-distortion image 700 derived using linear interpolation based on the nearest four pixel addresses weighted by the real-valued output of equation (1). As equation (1) rarely returns integral pixel addresses, the sampling can use e.g. nearest-neighbor or linear interpolation in some embodiments.

Figure 8:
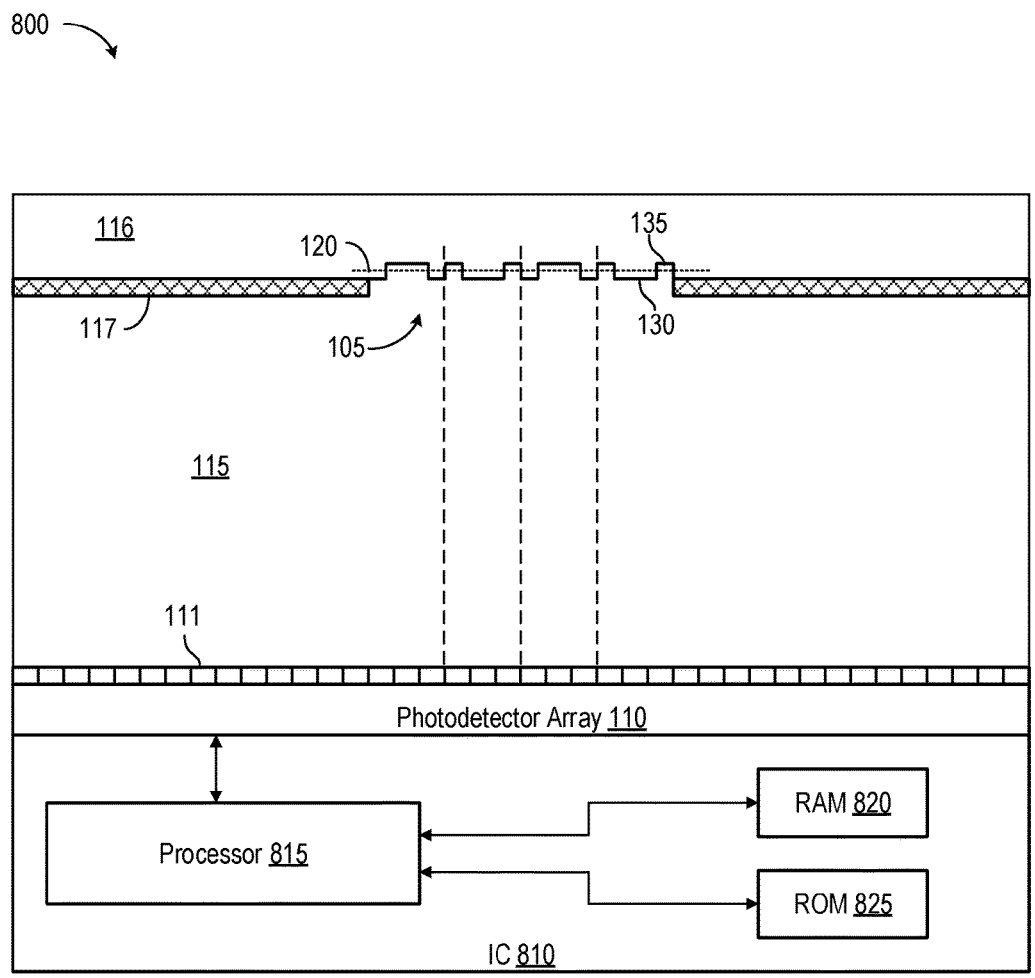
FIG. 8 is a cross section of an imaging system 800 in accordance with one embodiment.

FIG. 8 is a cross section of an imaging system 800 in accordance with one embodiment. System 800 is similar to device 100 of FIGS. 1A and 1B, with like-identified elements being the same or similar. System 800 differs from device 100 in that array 110 is integrated with our otherwise coupled to an integrated circuit (IC) device 810 that supports image acquisition and processing. In one embodiment, layer 115 is optical Lanthanum dense flint glass and layer 116 is a polycarbonate plastic. All the components of system 800 can be integrated into the same device or package.

In one embodiment, layer 116 is a twenty-micron phase-shift layer of a UV-cured plastic with a refractive index of about 1.4; layer 117 is a 2,000 Angstrom tungsten film patterned with an aperture 55 microns in diameter; and layer 115 is a 145 micron layer of glass adhered to array 110 via a five-micron layer of an optical adhesive (not shown). Array 110, in such an embodiment, can be a 200-by-200 pixel array with a pixel pitch of 1.67 microns.

IC 810 includes a processor 815, random-access memory (RAM) 820, and read-only memory (ROM) 825. ROM 825 can store a digital representation of the deconvolution kernel for the PSF of grating 105, along with other parameters or lookup tables in support of image processing. Processor 815 captures digital image data from array 110 and uses that data with the stored PSF to compute e.g. image data 400 and image 700 of FIGS. 4 and 7. Processor 815 uses RAM 820 to read and write data in support of image processing. Processor 815 may include SIMD instructions, butterflies accelerating the Cooley-Tukey FFT algorithm in hardware, and other specialized processing elements which aid fast, power-efficient Fourier- or spatial-domain deconvolution.

Figure 9:
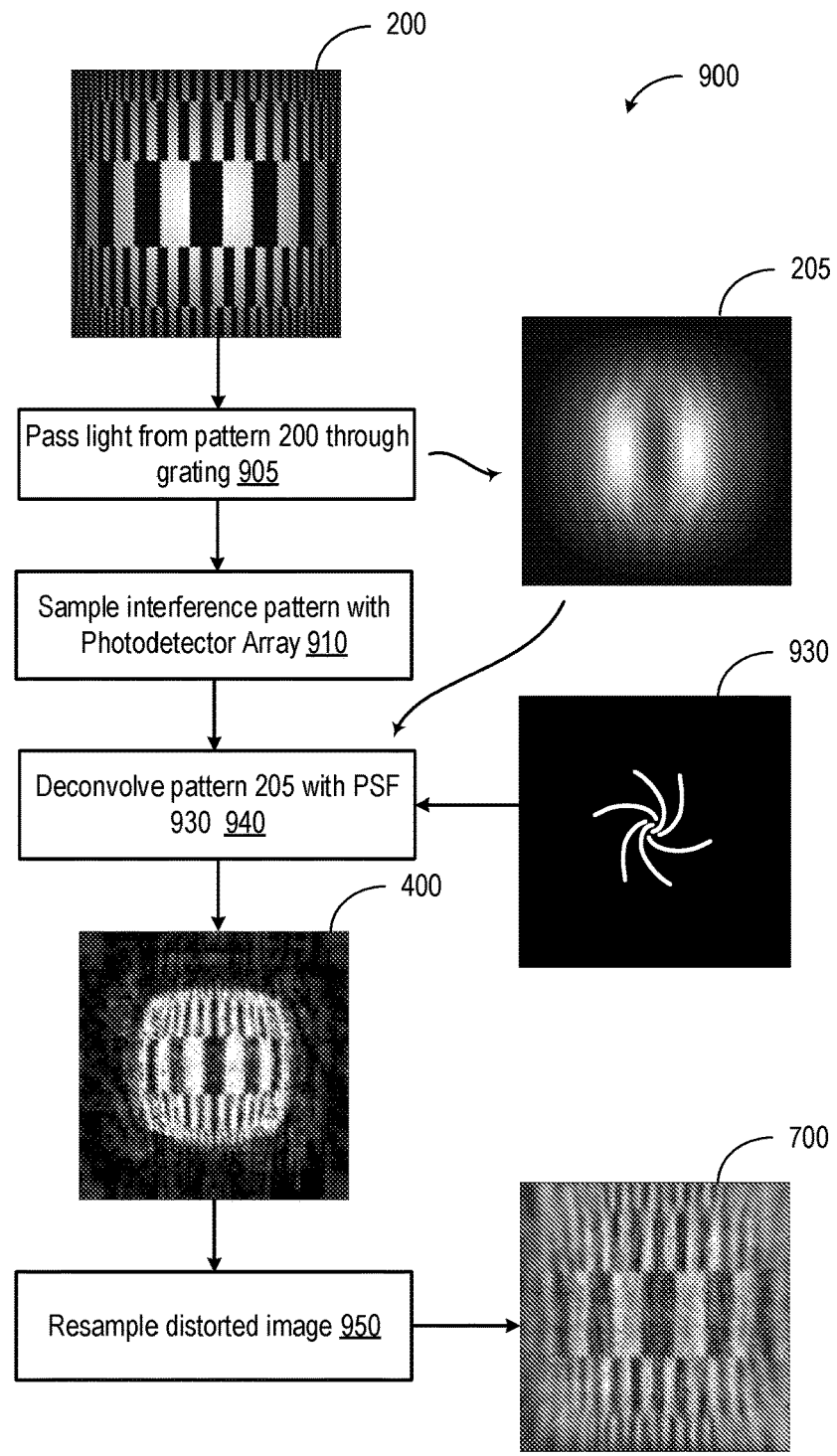
FIG. 9 is a flowchart 900 detailing how an image of test pattern 200 of FIG. 2 can be captured and resolved using an embodiment of device 100 of FIGS. 1A and 1B.

FIG. 9 is a flowchart 900 detailing how an image of test pattern 200 of FIG. 2 can be captured and resolved using an embodiment of device 100 of FIGS. 1A and 1B. First, test pattern 200 is presented such that light from pattern 200 is incident device 100 and passes through grating 105 (905) to produce interference pattern 205. Photodetector array 110 then samples pattern 205 (910). The captured pattern 205 may appear unintelligible; however, because grating 105 has sharp features in its point-spread function (PSF), pattern 205 contains rich information about the image.

The PSF of grating 105, possibly in combination with the underlying array, is known from a prior calibration or high-fidelity simulation. This information is represented by a response 930, a digital representation of which can be stored within device 100 or elsewhere. Alternatively, the spatial- or Fourier-domain deconvolution kernel needed to undo the effects of convolving with the PSF may be stored. Sampled pattern 205 is deconvolved using response 930, using e.g. spatial or Fourier deconvolution, to construct barrel-distorted image data 400 (940). Finally, distorted image data 400 is resampled (950) to obtain reduced-distortion image 700.

The noise level and operational requirements for the system may not be constant in time. For instance, with changing light levels which influence the signal to noise level in captured data or operational requirements for at times high resolution, and at other times low noise each lead to differences in the appropriate deconvolution kernel. These changing requirements can be met by using deconvolution kernels with changing regularization parameters. For example, a regularized deconvolution kernel can be computed as follows:

$$k = \mathcal{F}^{-1}\left(\frac{\mathcal{F}(PSF)^*}{|\mathcal{F}(PSF)^2| + \gamma}\right)$$

where γ depends on the degree of noise robustness desired. It may thus be desirable for a sensor to have access to a spectrum of deconvolution kernels, with a variety of noise rejection characteristics. In this case, a variety of deconvolution kernels can be stored directly in memory, or can be computed as needed either from interpolation from two or more stored deconvolution kernels or from the PSF itself, as will be evident to those skilled in the art.

Figure 10:
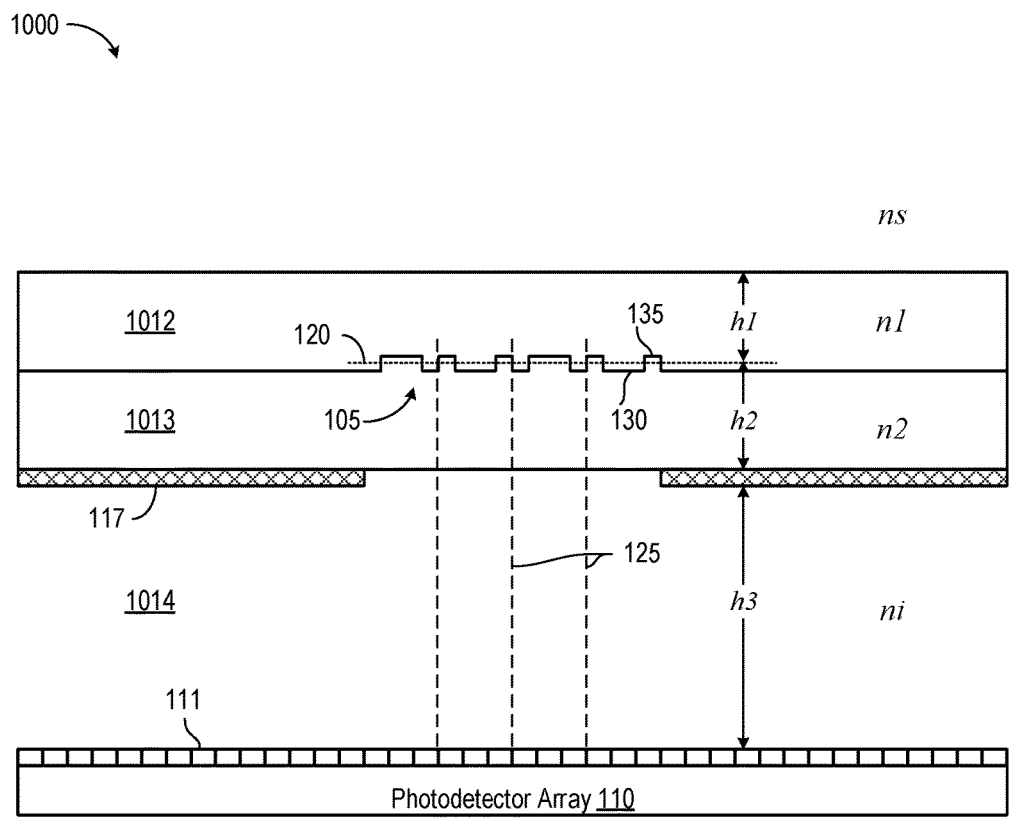
FIG. 10 is a cut-away view of an imaging device 1000 with a binary, phase-antisymmetric grating 1005 in accordance with an embodiment in which device structures are made to minimize barrel distortion.

FIG. 10 is a cut-away view of an imaging device 1000 with a binary, phase-antisymmetric grating 1005 in accordance with another embodiment. Device 1000 is similar to device 100 of FIG. 1, with like-identified elements being the same or similar. However, device 1000 is modified relative to device 100 to reduce barrel distortion, and thus support efficient algorithms for image extraction. In particular, a space above array 110 reduces barrel distortion.

Grating 1005 is formed by an interface between light-transmissive media of different refractive indices, a twenty-micron phase-shift layer 1012 of UV-cured plastic and a twenty-micron layer 1013 of thermoplastic with respective indices n1=1.41 and n2=1.61 in this example. Different combinations of indices can be used, and index n2 can be less than index n1. A space 1014 with refractive index ni separates layer 1013 from array 1010.

In this example, space 1014 provides a separation h3 of about 145 microns and has a refractive index ni near one to match the refractive index ns of the medium through which light travels from objects in an imaged scene to device 1000. For example, index ns might be air, in which case index ni would be close to one and the medium separating array 1010 from the grating might be e.g. a gas or a vacuum. For aquatic or in vivo applications index ni might be closer to that of the fluid environment.

Figure 11:
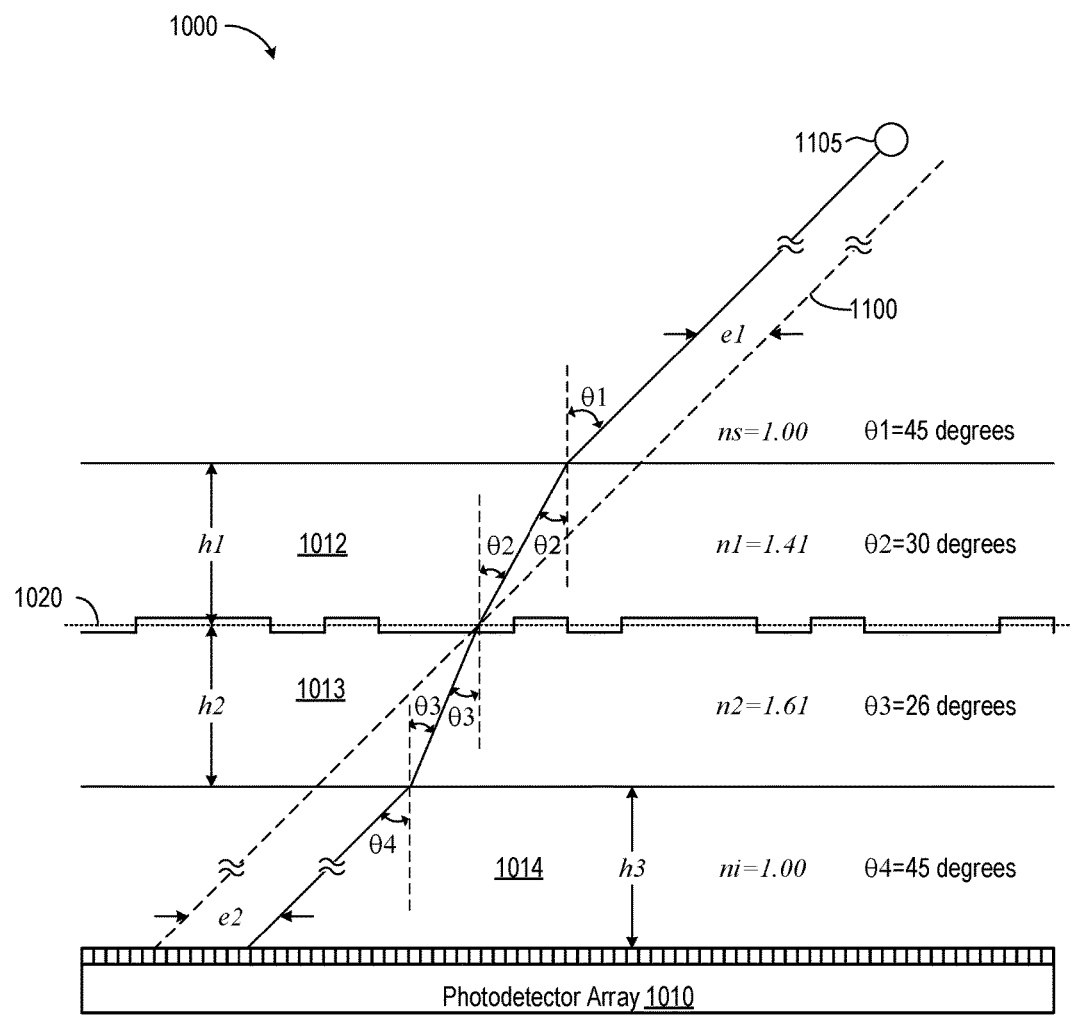
FIG. 11 is a cutaway view of device 1000 of FIG. 10 with some features omitted and others emphasized to highlight refractive errors associated with layers 1012 and 1013.

FIG. 11 is a cutaway view of device 1000 of FIG. 10 with some features omitted and others emphasized to highlight refractive errors associated with layers 1012 and 1013. Absent refraction, a ray 1100 entering the face of device 1000 at an incident angle of 45 degrees follows a straight path. Layers 1012 and 1013 create three refractive interfaces, however, so a ray from a point source 1105 entering the face of device 1000 the same 45-degrees angle of incidence and intersecting the grating at the same point as ray 1100 takes a considerably different path. Following Snell's law, and given the indices ns=1.00, n1=1.41, n2=1.61, and ni=1.00, the divergent path through layer 1012 will produce an error: $e1=h1(\tan\theta_1-\tan\theta_2)$ and the divergent path through layer 1013 will produce an error: $e2=h2(\tan\theta_1-\tan\theta_3)$, where h1 and h2 are the thicknesses of respective layers 1012 and 1013 and the noted angles $\theta_x$ are as labeled in FIG. 11. Because indices ns and ni are equal, both parallel rays entering device 1000 will remain parallel through space 1014.

Error e1 is proportional to thickness h1, a value that is inconsequential in comparison with the dimensions of imaged scenes. In the embodiment of FIG. 11, in which thickness h1 is twenty microns, error e1 is 8.5 microns for rays incident at an angle of 45 degrees. For comparison, the diameter of a human hair ranges between about twenty and eighty microns, so error e1 would be expected to distort an image of a human by much less than a hair's breadth for light at incident angles of over 45 degrees.

Error e2 is proportional to thickness h2, which is the same twenty microns as for thickness h1. Thickness h2 is far from inconsequential, however, as the relevant dimensions are those of array 1010. In this example, error e2 is 9.8 microns for rays incident at an angle of 45 degrees. Pixel pitch is 1.67 microns, so the offset imposed by error e2 translates into an error of about six pixels for light at incident angles of over 45 degrees. Such an error ease easily observed in the image data. Error e2 increases with incident angle, leading to barrel distortion.

Figure 12:
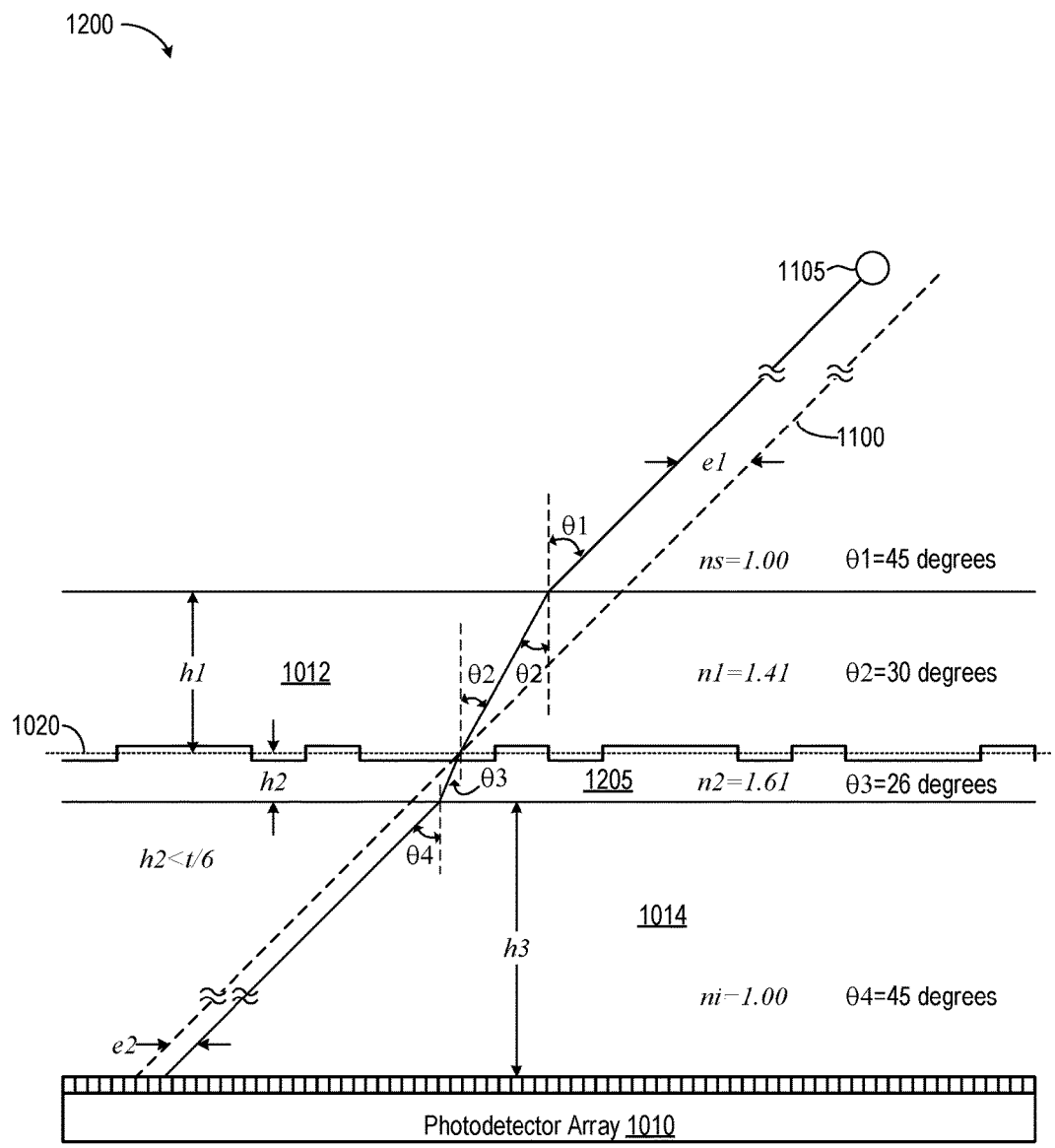

FIG. 12 is a cutaway view of a device 1200 similar to device 1000 of FIGS. 10 and 11 with like-identified elements being the same or similar. Device 1200 differs from device 1000 in that the thickness of the underlying grating layer 1205 is eight microns rather than twenty. As in the example of FIG. 11, error e2 is proportional to thickness h2. Reducing thickness h2 by sixty percent likewise reduces error e2 by sixty percent, to about 3.9 microns in this example. Pixel pitch is 1.67 microns, so the offset imposed by error e2 translates into an error of between two and three pixels for light at 45-degree incident angles. This represents a considerable improvement over the example of FIG. 11. The reduced distortion of the raw image data improves the quality of image recovery by computationally efficient deconvolution techniques.

Figure 13:
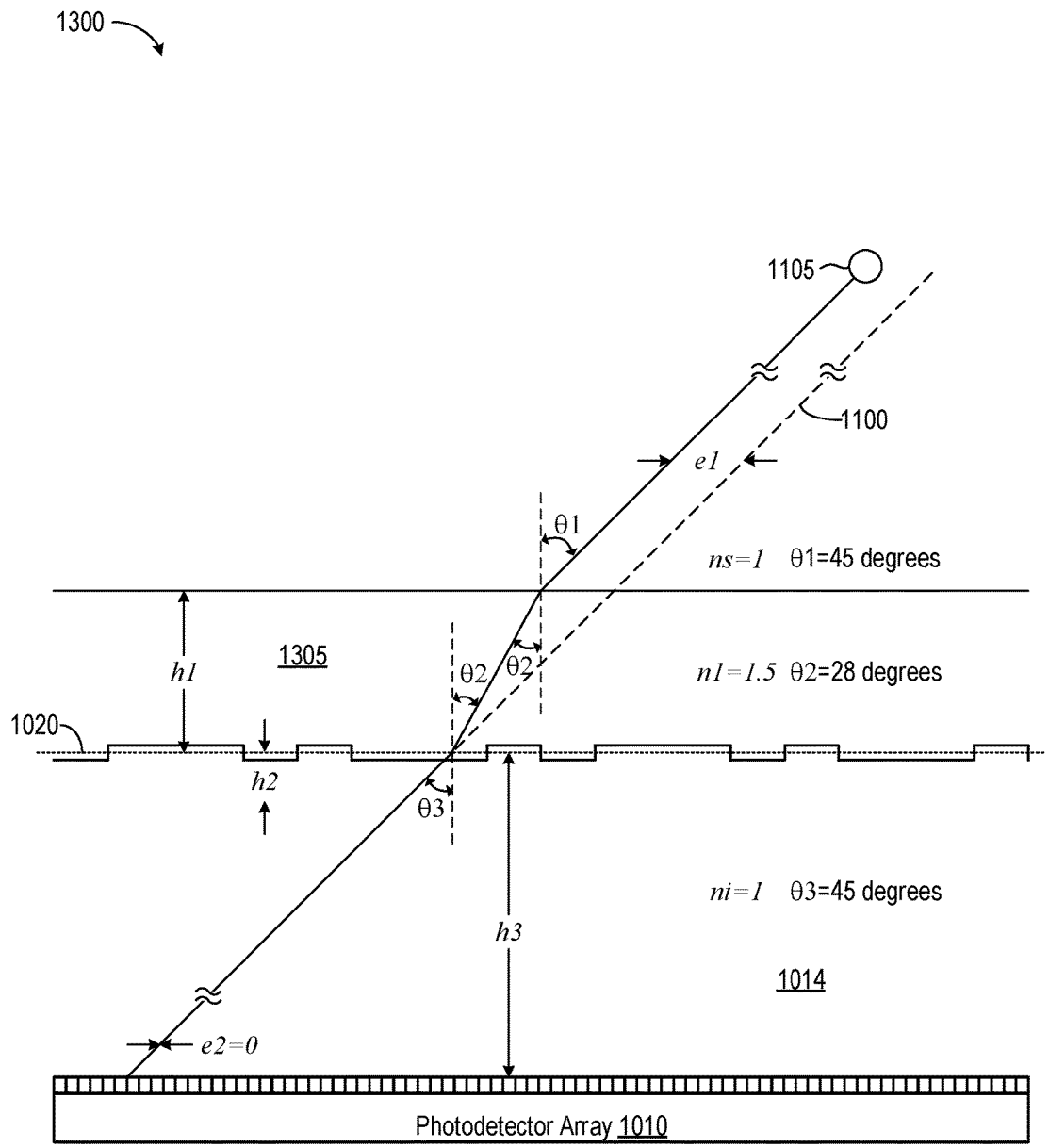

FIG. 13 is a cutaway view of a device 1300 similar to device 1000 of FIGS. 10 and 11 with like-identified elements being the same or similar. Device 1300 differs from device 1000 in that the upper grating layer 1305 is glass with a refractive index n1=1.5 etched to form a phase grating of the type detailed previously. An error e1 remains as a consequence of the optical media above the grating, but this error is relatively inconsequential for the reasons noted above in connection with FIG. 11. Error e2 goes to zero, however, as the only optical media below the grating is a space 1014 with a refractive index ni matching that of the scene ns. Any barrel distortion is thus due to error e1, which can generally be ignored.

Figure 14:
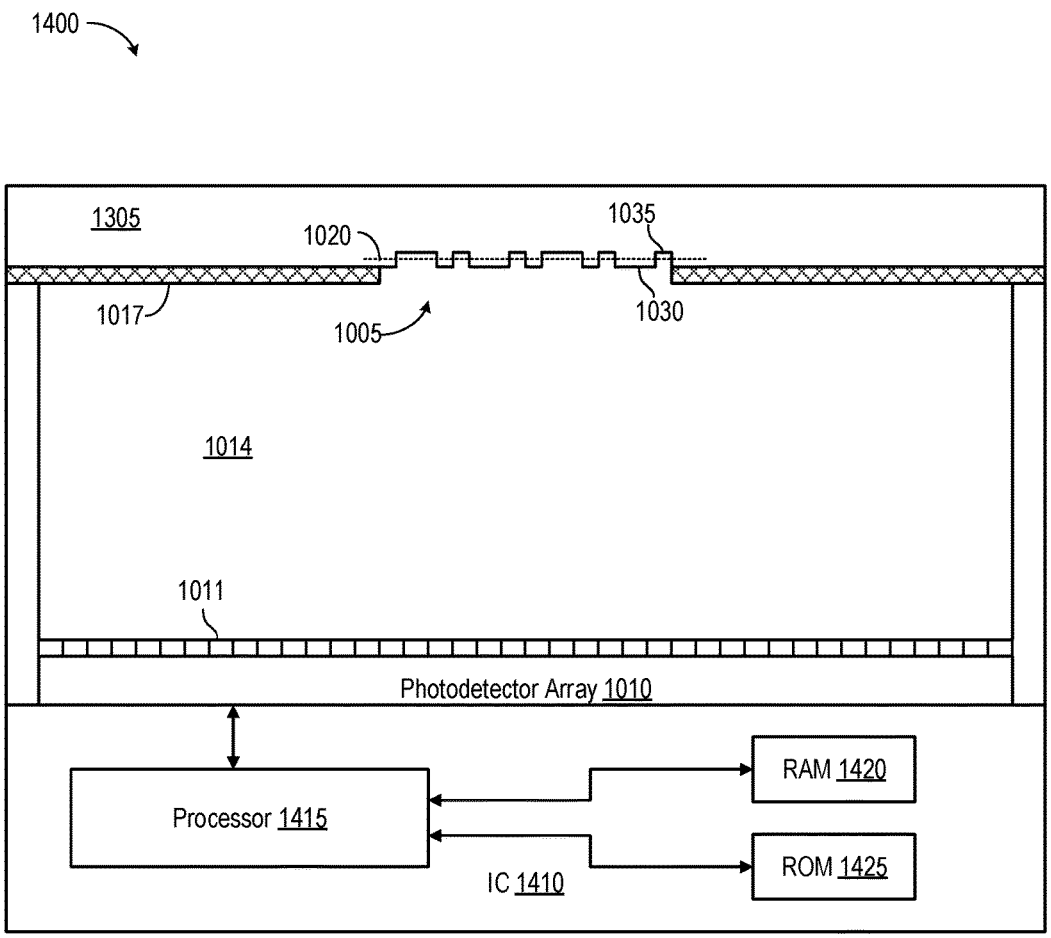
FIG. 14 is a cross section of an imaging system 1400 in accordance with one embodiment.

FIG. 14 is a cross section of an imaging system 1400 in accordance with one embodiment. System 1400 is similar to device 1300 of FIG. 13, with like-identified elements being the same or similar. System 1400 differs from device 1300 in that array 1010 is integrated with or otherwise coupled to an integrated circuit (IC) device 1410 that supports image acquisition and processing. All the components of system 1400 can be integrated into the same device or package using microfabrication techniques well known to those of skill in the art.

IC 1410 includes a processor 1415, random-access memory (RAM) 1420, and read-only memory (ROM) 1425. ROM 1425 can store a digital representation of the PSF of grating 1005 from which a noise-dependent deconvolution kernel may be computed. ROM 1425 can store a deconvolution kernel for the PSF along with other parameters or lookup tables in support of image processing. Processor 1415 captures digital image data from array 1010 and uses that data with the stored PSF to compute e.g. images and other image data. Processor 1415 uses RAM 1420 to read and write data in support of image processing. Processor 1415 may include SIMD instructions, butterflies accelerating the Cooley-Tukey FFT algorithm in hardware, and other specialized processing elements which aid fast, power-efficient Fourier- or spatial-domain deconvolution.

The noise level and operational requirements for the system may not be constant in time. For instance, with changing light levels which influence the signal to noise level in captured data or operational requirements for at times high resolution, and at other times low noise each lead to differences in the appropriate deconvolution kernel. These changing requirements can be met by using deconvolution kernels with changing regularization parameters. For example, a regularized deconvolution kernel can be computed as follows:

$$k = \mathcal{F}^{-1}\left(\frac{\mathcal{F}(PSF)^*}{|\mathcal{F}(PSF)^2|+\gamma}\right)$$

where γ depends on the degree of noise robustness desired. It may thus be desirable for a sensor to have access to a spectrum of deconvolution kernels, with a variety of noise rejection characteristics. In this case, a variety of deconvolution kernels can be stored directly in memory, or can be computed as needed either from interpolation from two or more stored deconvolution kernels or from the PSF itself, as will be evident to those skilled in the art.

While the subject matter has been described in connection with specific embodiments, other embodiments are also envisioned. For example; while each grating detailed previously may be used in connection with photoreceptors to collect incident light, gratings in accordance with these and other embodiments can be used more generally in imaging devices that project images using photoelements that admit light; the wavelength band of interest can be broader or narrower than the visible spectrum, may be wholly or partially outside the visible spectrum, and may be discontinuous; cameras and gratings detailed herein can be adapted for use in multi-aperture or programmable-aperture applications; and imaging devices that employ other types of gratings can benefit by application of methods disclosed herein. Suitable gratings are detailed in U.S. application Ser. No. 14/458,179 to Patrick Gill, David Stork, and Jay Endsley, filed 12 Aug. 2014 and entitled "Patchwork Fresnel Zone Plates for Lensless Imaging," which is incorporated herein by reference. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A system for imaging light from a scene in a first medium of a first refractive index, the system comprising:
 a phase-shift layer of a second refractive index having a first surface to face the scene and receive the light from the scene and a second surface opposite the first surface and including a grating to produce an interference pattern of a point-spread function for corresponding points of the light from the scene, locations of the point-spread functions determined by incident angles of the points of the light from the scene; and
 a photodetector array spaced from the phase-shift layer opposite the second surface, the photodetector array to sample the interference pattern;
 wherein the photodetector array is separated from the phase-shift layer by a second medium of the first refractive index.

2. The system of claim 1, wherein the second medium comprises air.

3. The system of claim 1, further comprising a second phase-shift layer between the grating and the second medium.

4. The system of claim 1, further comprising an opaque layer defining an aperture between the grating and the photodetector array.

5. The system of claim 4, wherein the array occupies an array area and the aperture occupies an aperture area less than the array area.

6. The system of claim 1, further comprising memory to store the point-spread function of the grating.

7. The system of claim 1, further comprising a processor coupled to the photodetector array, the processor to deconvolve the sample of the diffraction pattern with the point-spread function of the grating.

8. The system of claim 7, the processor to deconvolve the sample using Fourier deconvolution.

9. The system of claim 1, each point-spread function having a center uniquely determined by an incident angle of the corresponding point of the light from the scene.

10. A system for imaging a scene in a first medium of a first refractive index, the system comprising:
 a first phase-shift layer of a second refractive index having a first surface to face the scene and a second surface opposite the first surface and including a grating to produce a diffraction pattern from the scene;
 a photodetector array spaced from the first phase-shift layer opposite the second surface, the photodetector array to sample the diffraction pattern;
 wherein the photodetector array is separated from the first phase-shift layer by a second medium of the first refractive index; and
 a second phase-shift layer between the grating and the second medium, wherein the second phase-shift layer is of a thickness less than one sixth a separation between the second phase-shift layer and the photodetector array.

11. A system for imaging a scene in a first medium of a first refractive index, the system comprising:
 a first phase-shift layer of a second refractive index having a first surface to face the scene and a second surface opposite the first surface and including a grating to produce a diffraction pattern from the scene;
 a photodetector array spaced from the first phase-shift layer opposite the second surface, the photodetector array to sample the diffraction pattern;
 wherein the photodetector array is separated from the first phase-shift layer by a second medium of the first refractive index; and
 a second phase-shift layer between the grating and the second medium, wherein the second phase-shift layer is of a third refractive index greater than the first refractive index.

12. The system of claim 11, wherein the third refractive index is greater than the second refractive index.

13. The system of claim 11, wherein the second refractive index is greater than the third refractive index.

* * * * *